Oct. 10, 1961  P. L. STEFFENSEN  3,003,756
PELLET FURNACE
Filed Aug. 18, 1958  4 Sheets-Sheet 1

INVENTOR
Percy L. Steffensen
BY Nat M Emery Jr.
ATTORNEY

INVENTOR
Percy L. Steffensen
BY Natt M Emery Jr.
ATTORNEY

Oct. 10, 1961 P. L. STEFFENSEN 3,003,756
PELLET FURNACE
Filed Aug. 18, 1958 4 Sheets-Sheet 3

INVENTOR
Percy L. Steffensen
BY Natt M Emery Jr.
ATTORNEY

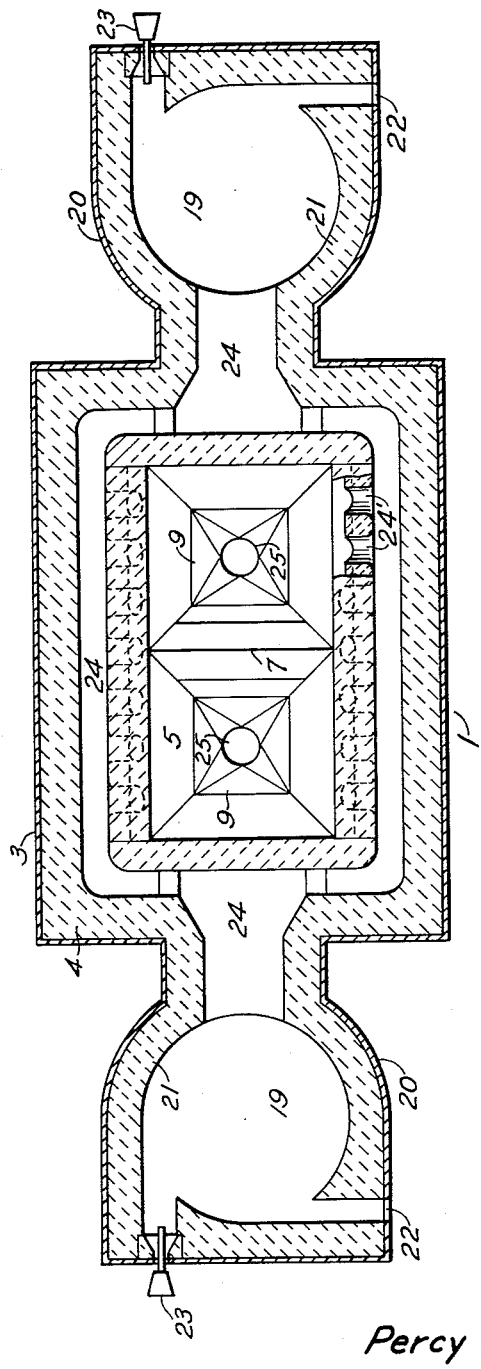

United States Patent Office 3,003,756
Patented Oct. 10, 1961

3,003,756
PELLET FURNACE
Percy Lea Steffensen, Cornwall, Pa., assignor to Bethlehem Steel Company, a corporation of Pennsylvania
Filed Aug. 18, 1958, Ser. No. 755,481
3 Claims. (Cl. 263—29)

This invention relates to a furnace of the counterflow vertical shaft type for treating small objects of generally uniform size and shape, which may typically be moist pellets of iron ore concentrates required to be hardened, and to a method of operating such furnace.

Furnaces of the subject type receive pellets which are continuously charged at the top of the shaft and are permitted to descend as a slowly moving column of separate pellets to their final discharge at the bottom. The pellets during this time are first heated to slightly below their fusion temperature in a zone near the top of the shaft by hot gases from contiguous combustion chambers, and are then cooled by air blown in near the bottom of the shaft.

Iron ore pellets, to take a typical example, must be fired to very high temperatures, in the neighborhood of 2300° F., for proper hardening, yet upon discharge should be as nearly cold as possible to permit handling.

For reasons of thermal efficiency, the air is preheated in its upward passage through the pellets and a portion of this air is passed directly into the combustion chambers. However, I have found that this procedure has resulted in a carryover of dust which at temperatures above approximately 1850° F. causes fusion in the upper port areas of the combustion chambers and eventually restricts the flow of air therethrough.

When clean air from the outside atmosphere was blown directly into the combustion chambers, the dust nuisance was eliminated, allowing the combustion chambers to be operated at 2200–2400° F., and the maximum pellet temperature at the top of the shaft was raised to a satisfactory level. However, there was then insufficient air to cool the pellets properly, and the pellets when discharged were at about 1100° F. This was obviously far too hot for safe handling, and resulted in much waste of heat.

In accordance with the present invention, the hot pellets from the furnace are cooled in one or more separate chambers by a current of air which carries the heat from the pellets to recuperators in which the heated air will indirectly preheat clean air to the combustion chambers.

The principal object of the present invention, therefore, is to provide a vertical shaft furnace and a method of operating the same which will combine the advantages of excellent fuel and heat economy, proper pellet temperatures at top and bottom, and no dust in combustion chambers.

Other and further purposes, objects and advantages of the invention will appear hereinafter in the specification and claims, and in the annexed four (4) sheets of drawings, in which—

FIG. 4 is a horizontal transverse section taken on the line 4—4 of FIG. 2, through the furnace shaft and both combustion chambers.

Figure 1:
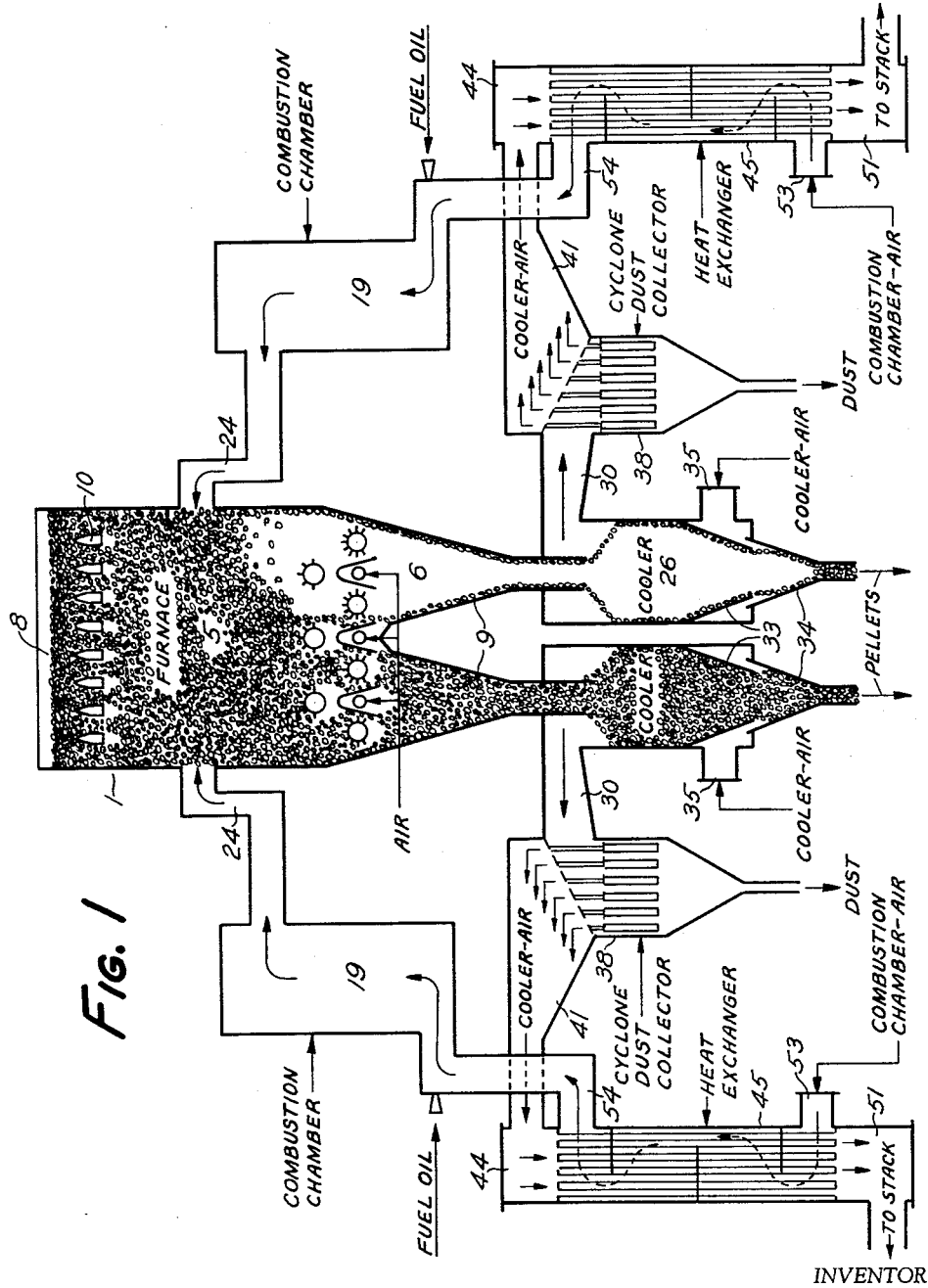
FIG. 1 is a somewhat diagrammatic representation in elevation of the complete pellet furnace organization of my invention.

Referring more particularly to the drawings, the basic shaft furnace 1 comprises a framework 2 of structural members supporting a metal shell 3 protectively enclosing refractory brickwork 4 forming a shaft of elongated rectangular cross-section, the inner walls of which are substantially vertical in the top zone 5 for approximately the upper two-thirds of their height, and inwardly sloping about 12° to 15° from vertical in the bottom zone 6 toward a centrally positioned peaked low brick wall 7. Said wall 7 splits the pellet charge 8 into two virtually equal parts which descend into the pair of parallel vertical hoppers 9 disposed thereunder.

A series of horizontally spaced divider plates 10, being preferably hollow castings through which a coolant such as air is circulated, projects into the mass of hot pellets in the upper zone 5 of the furnace. These divider plates 10 create openings between the descending pellets near the sides of the furnace which provide a free flow of air for faster pellet drying.

Any large chunks of cohering pellets in the bottom zone 6 of the furnace will be pulled apart by toothed agitator shafts 11 mounted in self-aligning thrust bearings 12 supported on the furnace framework, and further broken up by toothed crusher segments 13 on rocker shafts 14 journaled in bearings 15. Said shafts 11 and 14 extend horizontally across the bottom zone 6 of the furnace in spaced parallel relation to the center wall 7, are preferably hollow to permit circulation of coolant therethrough, and are adapted to be partially rotated by reciprocating crank arms 16 actuated by conventional mechanical or hydraulic cylinder means (not shown) at appropriate intervals to maintain a uniform rate of descent of the pellets.

The rocker shafts 11 and 14 and associated devices are further protected from heat damage by air from a blower (not shown), introduced through parallel horizontal pipes 17 shielded by inverted V-shaped covers 18. This portion of the air then travels up through the furnace shaft where it receives heat from the descending hot pellets and finally supplies 40 to 60 percent of the heat required to dry and harden the upper layers of incoming moist pellets.

Symmetrically positioned at opposite ends of the furnace shaft 1 in contiguous relation to the upper zone 5 thereof are two substantially cylindrical combustion chambers 19 each having an outer metal shell 20 and a refractory brick lining 21. Each of said combustion chambers 19 is provided with an inlet 22 for admitting air which has been preheated by means to be hereinafter described, a burner 23 for liquid or gas fuel, and a conduit 24 conducting the combustion gases therefrom through ports 24' to the upper zone 5 of the furnace.

Figure 2:
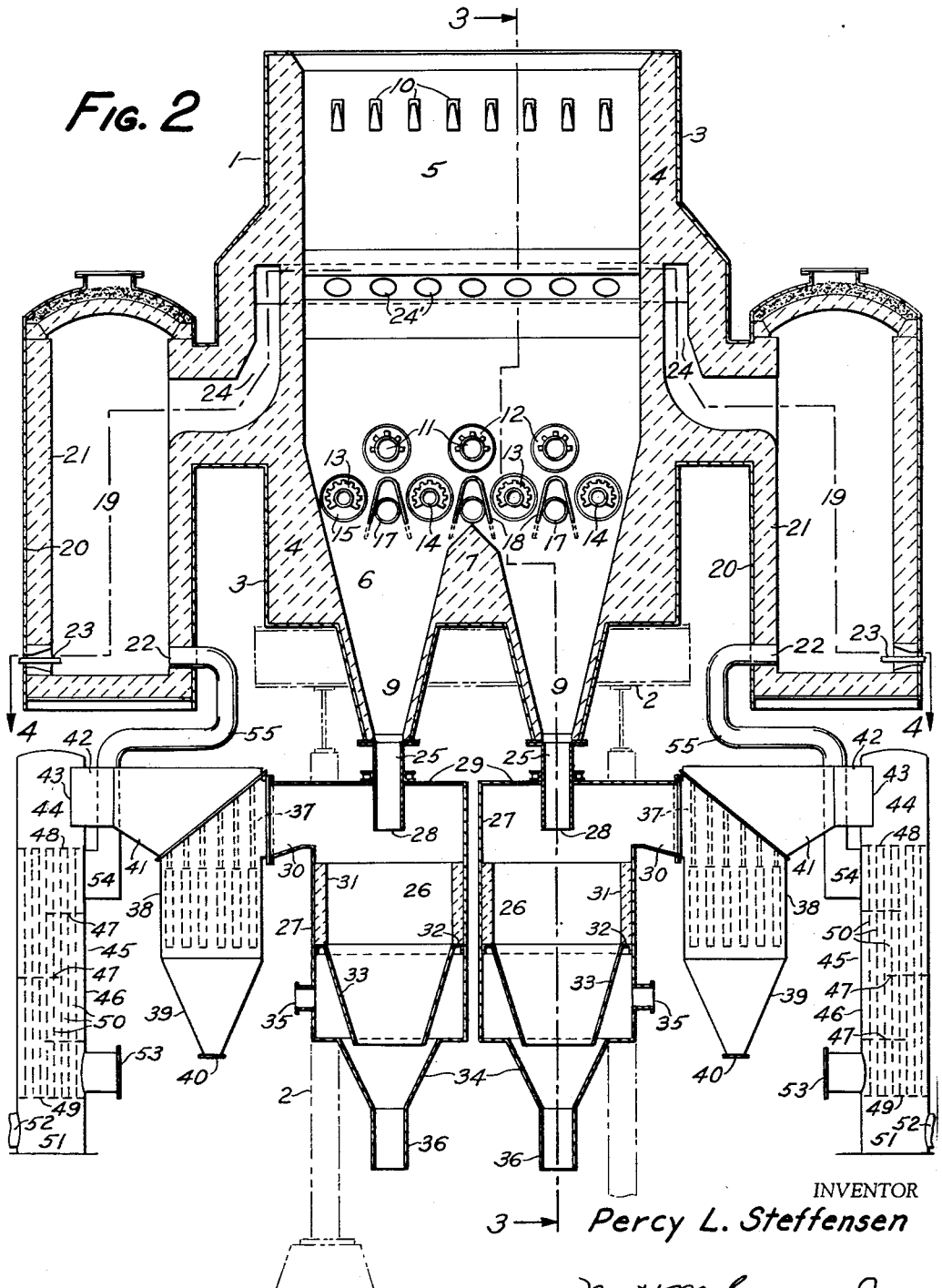
FIG. 2 is a vertical transverse section taken through the furnace, combustion chamber, and pellet coolers, with the dust collectors and heat exchangers being shown in elevation.
Figure 3:
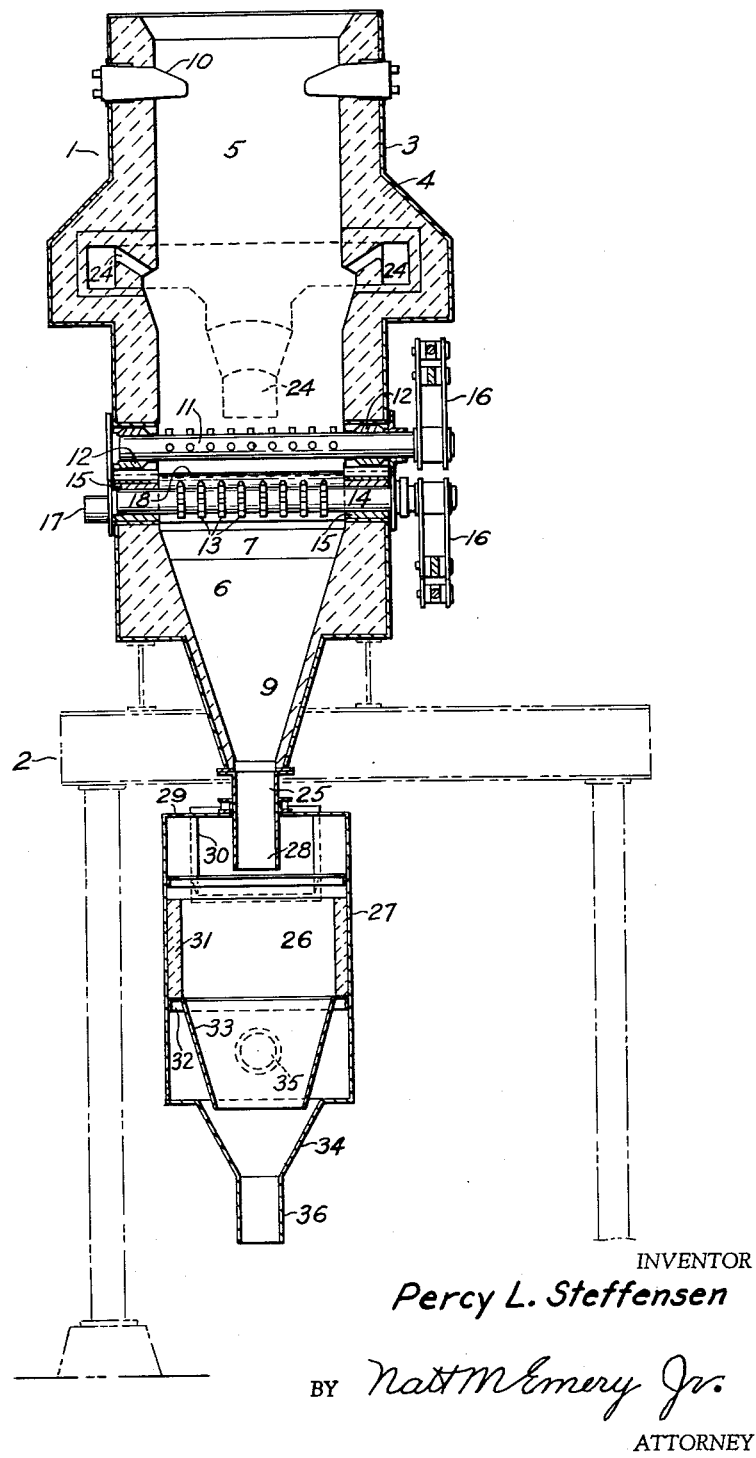
FIG. 3 is a vertical transverse section on the line 3—3 of FIG. 2, showing the furnace shaft and one of the pellet coolers therebeneath.

Extending vertically below each of the hoppers 9 is a constricted conduit or throat portion 25 connecting to a separate pellet cooler 26 which latter is preferably rigidly suspended from the supporting structure 2 of the furnace. Said pellet cooler 26 consists of a cylindrical metal shell 27 having a pellet inlet 28 in the center of the top plate 29 and an air discharge offtake 30 contiguous thereto. The intermediate portion of the shell 27 is lined with refractory blocks 31 supported on angle irons 32 formed to annular shape and securely welded inside the shell. Depending from said angle irons 32 within each cooler shell 27 is an upper cooler hopper 33, beneath which in spaced relation is a lower cooler hopper 34 depending from the bottom of the shell 27. As shown in FIGS. 2 and 3, the upper cooler hopper 33 has an inner slope of 20° from vertical, and the slope of the lower cooler hopper 34 is 25°, but neither slope is especially critical. An air inlet pipe 35 connected to a powerful blower (not shown) admits air under pressure to the space between the cooler hoppers 33 and 34 and upward through the pellets. The cooled pellets are finally discharged through the bottom pipe 36.

The offtake 30 for the dusty preheated air from each pellet cooler 26 connects to the inlet port 37 of a dry dust collector 38 wherein dust particles from the pellets are collected, then settle to the bottom of the large outer cone 39 and are removed through a clean-out hole 40. The cleaned preheated air passes through offtake 41 and duct 42 through inlet 43 to the upper chamber 44 of vertical tubular heat exchanger 45. Said heat exchanger 45 comprises a cylindrical shell 46 having therein a plurality of staggered horizontal baffle plates 47 and upper and lower tube sheets 48 and 49 supporting a plurality of vertical tubes 50. The hot air from the dust collector 38 passes through the tubes 50 to the lower chamber 51 and leaves by the discharge vent 52. Clean outside air enters the shell 46 through the lower opening 53, travels in a sinuous path around the tubes 50, and passes from outlet 54 through duct 55 to the inlet 22 of combustion chamber 19.

By the use of the pellet coolers 26, the temperature of the hot pellets, received from the furnace at about 1000° to 1100° F., can be lowered to about 200 to 250° F., while the air blown into the coolers is raised from atmospheric temperatures to about 900° to 1000° F. This will preheat the combustion air in the heat exchangers 45 to about 800° F., with a correspondingly large increase in efficiency in the combustion chambers 19. The dust collectors 38 remove most of the pellet dust from the preheating air before it reaches the heat exchangers 45, and none of the dust goes to the combustion chambers 19.

The improvement in thermal efficiency in my furnace is evident from a comparison of operating temperatures and fuel consumption rates characteristic of the three types of furnaces mentioned above, as in the following table:

|  | (A) All air from bottom | (B) Clean combustion air No preheat | (C) Preheated clean combustion air |
| --- | --- | --- | --- |
| Pellet temps. (F.): |  |  |  |
| Max. (top) | 2,300 | 2,300 | 2,300 |
| Discharge (bottom) | 350 | 1,100 | 200 |
| Gas temps. (F.): |  |  |  |
| Combustion chambers | 1,900 max. | 2,350 | 2,350 |
| Exhaust (top) | 600 | 350 | 350 |
| Fuel consumption: B.t.u.'s (per net ton pellets) | 685,000 | 700,000 | 560,000 |

Although this invention has been described hereinabove in considerable detail, it is not desired to limit the invention narrowly to the exact and specific particulars described, but there may also be used such substitutions, modifications or equivalents as are included within the scope and spirit of the invention or pointed out in the appended claims.

I claim:

1. A pellet treating apparatus comprising a shaft furnace in which pellets are received and heated; a combustion chamber communicating with the shaft furnace; a hopper beneath the shaft furnace; a constricted throat section beneath the hopper; a separate pellet cooling chamber beneath and communicating with said throat section; a dust collector communicating with and adjacent to the pellet cooling chamber; a recuperative heat exchanger communicating with the dust collector; means for introducing and directing a portion of clean outside air vertically upwardly solely through the shaft furnace; means for directing other cooling air vertically upwardly through the pellet cooling chamber, thence through the dust collector, thence through the heat exchanger and thence to discharge; means for circulating another portion of clean outside air through the heat exchanger and for passing only the latter so-heated outside air into the combustion chamber; means for supplying fuel to the combustion chamber for combustion with only said latter heated outside air; and means for supplying the gaseous products of combustion to the shaft furnace adjacent the upper end thereof.

2. A pellet treating apparatus comprising a shaft furnace in which the pellets are heated, agitator means in the lower portion of the shaft furnace for promoting the descent of the pellets, air inlet means adjacent the agitator means, a chamber for receiving and cooling the pellets beneath the shaft furnace, means for circulating air through said cooling chamber and absorbing heat from the pellets, an offtake for withdrawing the dust-laden air from said cooling chamber, a dust collector to remove dust from the withdrawn air, a heat exchanger in which only clean outside air is heated by the air from the dust collector, a combustion chamber in which the latter treated clean air is utilized in the combustion of fuel, and a conduit conducting hot gases from the combustion chamber to the shaft furnace.

3. A method of treating pellets of iron ore or the like, comprising the steps of maintaining a continuous descent of pellets through a shaft furnace, heating said pellets to a high temperature in said shaft furnace, introducing air at the bottom of the shaft furnace and directing said air vertically upwardly in counterflow heat transferring relation through the descending pellets in said shaft furnace, cooling the pellets thereafter in a separate chamber by directing a body of other air in heat transfer therethrough, cleaning said body of air, and utilizing the heat retained in said body of cleaned air to preheat a completely separate body of clean outside air, and supplying only said preheated clean air to a combustion chamber which gives its heat to the furnace.

References Cited in the file of this patent

UNITED STATES PATENTS

| 2,194,454 | Greenawalt | Mar. 19, 1940 |
| 2,668,041 | Knibbs | Feb. 2, 1954 |
| 2,701,622 | Hodson | Feb. 8, 1955 |
| 2,744,743 | Beggs et al. | May 8, 1956 |
| 2,848,208 | Wynne et al. | Aug. 19, 1958 |

FOREIGN PATENTS

| 330,785 | Germany | Dec. 22, 1920 |